Figure 1:
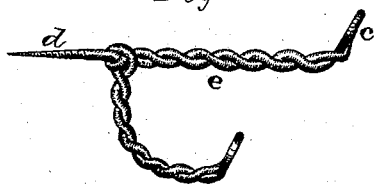
Figure 2:

C. H. THURSTON.
Wardrobe and Other Hooks.

No. 168,682.

Patented Oct. 11, 1875.

WITNESSES.

INVENTOR.

UNITED STATES PATENT OFFICE.

CHARLES H. THURSTON, OF MARLBOROUGH, NEW HAMPSHIRE.

IMPROVEMENT IN WARDROBE AND OTHER HOOKS.

Specification forming part of Letters Patent No. 168,682, dated October 11, 1875; application filed September 7, 1875.

CASE C.

*To all whom it may concern:*

Be it known that I, CHARLES H. THURSTON, of Marlborough, in the county of Cheshire and State of New Hampshire, have invented certain new and useful Improvements in Clothes-Hook; and I do hereby declare the following to be a full, clear, and exact description of the invention, such as will enable others skilled in the art to which it pertains to make and use it, reference being had to the accompanying drawings, which form part of this specification.

My invention consists in an improvement in wardrobe, picture, and harness hooks; and it consists in forming a self-attaching screw-hook from a single piece of wire, that is twisted and bent into shape, so as to make a strong, durable, light, and cheap hook that is adapted for a variety of purposes, and can be put up in any suitable place, as will be more fully described hereafter.

The accompanying drawings represent my invention.

I take a piece of wire of suitable length and thickness, and when it is desired to make a single hook, $a$, double the wire upon itself, forming a suitable head, $c$, at the point; then twist the wire, as shown, and bend it into any desired form. The screw-thread $d$ on the end of the wire, by which it is attached to any desired support, may be cut either before or after the hook has been formed.

Where a double hook, $e$, is to be formed, the wire is twisted, as above described; but, with the exception of bending up the head or knob $c$, the upper hook $g$ is left nearly straight, while the free end of the wire is dropped down below the upper hook, doubled upon itself, twisted, and bent into any suitable shape. The free end of the wire is fastened at any desired point by giving it a wrap around the stem, so as to prevent it from uncoiling and getting in the way.

The heads or knobs, consisting of round loops in the wire, can never catch in a garment to tear it, while they do prevent them from slipping off.

Hooks formed in this manner are lighter, cheaper, and more durable than cast-metal hooks, as they can never be broken. If bent out of shape they can be readily straightened again.

Having thus described my invention, I claim—

A hook made from a single piece of wire that is doubled upon itself, twisted, and bent into shape, as shown, and provided with a head or loop, $c$, and a screw, $d$, substantially as and for the purpose described.

In testimony that I claim the foregoing I have hereunto set my hand this 7th day of September, 1875.

C. H. THURSTON.

Witnesses:
    F. A. LEHMANN,
    J. WM. GARNER.